United States Patent Office 3,021,336
Patented Feb. 13, 1962

3,021,336
3-CYANO-5-METHYL-1,2,4-TRIAZOLE
Lucille Theresa Morin and Ken Matsuda, both of Stamford, Conn., assignors to American Cyanamid Company, New York, N.Y., a corporation of Maine
No Drawing. Filed May 6, 1960, Ser. No. 27,282
1 Claim. (Cl. 260—308)

The present invention relates to a novel and useful 1,2,4-triazole and to the preparation thereof. More particularly, the invention relates to the ring closure of 1-cyanoformimidic acid (2-acetylhydrazide) to form: 3-cyano-5-methyl-1,2,4-triazole, represented by the formula:

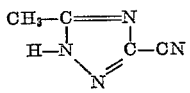

Reactant 1-cyanoformimidic acid (2-acetylhydrazide) is believed to be a novel compound. It is prepared, in general, by reacting cyanogen and hydrazine in equimolar quantities to form 1-cyanoformimidic acid hydrazide. Its preparation is more fully described in a copending application for Letters Patent, Serial No. 796,202, filed March 6, 1959. Equimolar quantities of said hydrazide and acetic anhydride are then reacted to form 1-cyanoformimidic acid-(2-acetylhydrazide). The latter reactant is capable of being ring closed to form 3-cyano-5-methyl-1,2,4-triazole. Unexpectedly, this may be accomplished by cyclizing 1-cyanoformimidic acid (2-acetylhydrazide) in the presence of acetic anhydride. The novel compound so prepared finds utility as an herbicide.

In general, temperatures in the range between about 20° C. to about 180° C. can be employed for effecting the desired cyclization of 1-cyanoformimidic acid (2-acetylhydrazide). It is preferred that temperatures in the range of between about 50° C. and 160° C. be employed at atmospheric pressure. If desired, either subatmospheric or superatmospheric pressure can be employed, provided that sufficient heat is supplied to cause at least refluxing and subsequent cyclization.

It has been found that measurable but small quantities of 3-cyano-5-methyl-1,2,4-triazole will form when 1-cyanoformimidic acid (2-acetylhydrazide) is heated in the range of from 50° C. to 160° C. and preferably under reflux conditions in the absence of a cyclization agent. Therefore, it is a preferred embodiment of the present invention to incorporate a cyclization agent to obtain a product of good yield and quality.

The agent employed herein to effect cyclization is: acetic anhydride. It is believed that the latter functions to remove water of cyclization by forming acetic acid and thus creates a reaction equilibrium favorable to the further cyclization of 1-cyanoformimidic acid (2-acetylhydrazide). Accordingly, sufficient acetic anhydride should be present to react with all the water formed during reaction. It is preferred that the acetic anhydride be present in an amount at least equal to that required to react with the number of mols of water formed during the reaction, and preferably in excess of that amount. Usually of from 1 to 10 mols or more of the anhydride per mol of the hydrazide will insure completion of the cyclization reaction.

An alternative procedure for the preparation of 3-cyano-5-methyl-1,2,4-triazole involves the cyclization of 1-cyanoformimidic acid hydrazide in a direct, one step process. This may be accomplished by reacting equimolar quantities of the said acid hydrazide with sufficient acetic anhydride to form 1-cyanoformimidic acid (2-acetylhydrazide) in situ and, then, effecting the cyclization of the latter.

Advantageously, cyclization of 1-cyanoformimidic acid (2-acetylhydrazide) in accordance with the process of the invention is accomplished within a relatively short time. It has been found that about 5 minutes to about 60 minutes are sufficient to effect cyclization.

In order to facilitate a further understanding of the present invention, the following representative examples are given. It is to be understood that they are merely illustrative and are not to be taken as limitative of the invention. All parts and percentages are by weight except as stated otherwise.

Example A

This example illustrates the preparation of 1-cyanoformimidic acid hydrazide.

To a stirred solution of 156 parts of cyanogen in 100 parts of dioxane, at 3° C. to 10° C., there is added over a period of 2.5 hours, a solution of 96 parts of hydrazine in 330 parts of a dioxane-methanol (10 to 1) mixture. Crystallization begins after about one-half hour and the solution gradually turns orange. After hydrazine addition is completed, agitation is continued for an additional half hour at about 5° C. The product is collected by filtration as 208.3 parts of light orange solid, melting at 73° C.–77° C. It is recrystallized from ethylene dichloride, yielding yellow plates melting at 83° C.–86° C. Analysis of the 1-cyanoformimidic acid so prepared for $C_2H_4N_4$ is as follows:

Calculated: C, 28.57; H, 4.8; N, 66.64; M.W. 84.0.
Found: C, 29.26; H, 4.94; N, 65.73; M.W. 86.5.

Example B

This example illustrates the preparation of 1-cyanoformimidic acid (2-acetylhydrazide).

12.0 parts of acetic anhydride (0.10 mol) are added to 400 parts (by volume) of benzene. 814 parts of 1-cyanoformimidic acid hydrazide (0.10 mol) are then added to the mixture in small increments with occasional stirring and cooling. Precipitation began immediately. The mixture is stirred for an additional hour and filtered. The precipitate is washed with ether and dried to give 12.5 parts of white solid having a melting point of 213° C. Recrystallization from acetone results in white crystals melting at 217° C. Resulting 1-cyanoformimidic acid (2-acetylhydrazide) analyzes as follows:

Calculated: C, 38.09; H, 4.79; N, 44.42; O, 12.68.
Found: C, 38.43; H, 4.78; N, 44.29; O, 13.37.

Example 1

This example illustrates the preparation of 3-cyano-5-methyl-1,2,4-triazole.

5.0 parts of 1-cyanoformimidic acid hydrazide (0.059 mol) prepared in accordance with the procedure of Example A above are added in small amounts to 70 parts of acetic anhydride (0.69 mol). Without isolating the 1-cyanoformimidic acid (2-acetylhydrazide) which precipitates, the mixture is refluxed at 140° C. for 15 minutes giving a clear yellow solution. Excess acetic anhydride and free acetic acid are evaporated, leaving a white oily solid, which is washed with benzene. Evaporation of benzene leaves an orange oil which is triturated with a minute quantity of water and filtered to give a white solid. The latter is dissolved in water, extracted with ether and the ether then evaporated. A 23% yield of the desired 3-cyano-5-methyl-1,2,4-triazole, a white solid of melting point 132° C. to 134° C., is obtained which upon analysis gives the following results in percent:

Calculated: C, 44.44; H, 3.73; N, 51.83. Found: C, 44.16; H, 4.13; N. 51.95.

Example 2

The procedure of Example 1 was repeated in every material detail except that preformed 1-cyanoformimidic acid (2-acetylhydrazide) prepared in accordance with Example B is employed. 3-cyano-5-methyl-1,2,4-triazole, a white solid of melting point 133° C., is obtained.

Example 3

The product obtained in Example 1 is subjected to typical herbicidal tests to determine its utility as an herbicide.

Approximately 50 radish seeds and 50 wheat seeds are each placed in separate 1-ounce bottles together with 25 cc. of a 0.1% water suspension containing 3-cyano-5-methyl-1,2,4-triazole. The bottle containing seed and the test compound is clamped in place on a tumbler where it is rotated for about 20 hours. The contents are then removed and washed with approximately 250 cc. of water to remove excess test compound. The washed seeds are placed on moist blotters and held in a high humidity cabinet for a five-day germination period. At the end of this time, 100% seed mortality is recorded.

We claim:

As a novel compound: 3-cyano-5-methyl-1,2,4-triazole.

References Cited in the file of this patent

Bladin: Beilstein (handbuch, 4th ed.), vol. 26, page 285 (1937).